US006633766B1

(12) United States Patent
van der Pol (10) Patent No.: US 6,633,766 B1
(45) Date of Patent: Oct. 14, 2003

(54) FREQUENCY SELECTIVE RF OUTPUT POWER CALIBRATION USING DIGITAL AND ANALOG POWER MEASUREMENTS FOR USE IN A CELLULAR TELECOMMUNICATIONS SYSTEM

(75) Inventor: Harry van der Pol, Hengelo (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/556,502

(22) Filed: Apr. 24, 2000

(51) Int. Cl.[7] ............................................. H04Q 7/20
(52) U.S. Cl. .................. 455/522; 455/552; 455/69; 375/297; 370/342; 370/318
(58) Field of Search ........................ 455/552, 69, 13.4, 455/126, 127, 13.1, 522; 375/297; 330/151, 279; 370/342, 318

(56) References Cited

U.S. PATENT DOCUMENTS

| 5,193,223 | A | 3/1993 | Walczak et al. |
| 5,371,473 | A | 12/1994 | Trinh et al. |
| 5,423,081 | A | 6/1995 | Thiele et al. |
| 5,452,473 | A | 9/1995 | Weiland et al. |
| 5,617,060 | A | 4/1997 | Wilson et al. |
| 5,627,857 | A | 5/1997 | Wilson |
| 5,715,526 | A | 2/1998 | Weaver, Jr. et al. |
| 5,732,334 | A | 3/1998 | Miyake |
| 5,745,846 | A | 4/1998 | Myer et al. |
| 5,960,333 | A | 9/1999 | Repke et al. |
| 6,285,887 | B1 * | 9/2001 | Mimura ...................... 455/522 |
| 6,335,924 | B1 * | 1/2002 | Yano et al. ................. 370/335 |
| 6,366,778 | B1 * | 4/2002 | Bender et al. .............. 455/442 |
| 6,377,786 | B2 * | 4/2002 | Mollenkopf et al. ........ 455/127 |
| 6,396,879 | B1 * | 5/2002 | Yoshimura et al. ......... 375/297 |
| 6,434,135 | B1 * | 8/2002 | Ozluturk et al. ............ 370/342 |
| 6,483,816 | B2 * | 11/2002 | Tsunehara et al. .......... 370/318 |

* cited by examiner

Primary Examiner—William Trost
Assistant Examiner—Danh C Le
(74) Attorney, Agent, or Firm—Nixon & Vanderhye P.C.

(57) ABSTRACT

In the context of a wideband CDMA (WCDMA) type base station (BS) in a cellular telecommunications network, radio frequency (RF) gain is accurately controlled for each of multiple carrier frequency bands without having to disturb the normal operation of the amplifier chain once installed at the BS. The power of a summed or combined digital baseband user signal is determined and integrated over a specific time interval. The digital baseband signal is upconverted and amplified by one or more (e.g., a chain of) RF amplifiers. The power of the transmitted RF signal (downlink signal transmitted by the BS) is detected in a frequency selective manner, and integrated over the same time interval. The difference between the integrated baseband power and the RF transmit power is determined to provide an overall gain for the RF chain for the specific carrier frequency measured. This gain value is compared with a target gain value to determine a gain adjustment or correction factor which is applied in the digital domain prior to digital-to-analog conversion (DAC). Accordingly, gain control for each of a plurality of different carrier frequency bands is substantially continuously performed during normal operation of the BS.

25 Claims, 5 Drawing Sheets

FREQUENCY SELECTIVE RF OUTPUT POWER CALIBRATION USING DIGITAL AND ANALOG POWER MEASUREMENTS FOR USE IN A CELLULAR TELECOMMUNICATIONS SYSTEM

FIELD OF THE INVENTION

The present invention relates to a system and method for accurate RF output power control using digital and analog power measurements. In certain embodiments, this invention relates to such a system and method in the context of a base station (BS) in a cellular telecommunications system.

BACKGROUND OF THE INVENTION

One type of radio access scheme which has become increasingly popular over the last several years is known as code division multiple access (CDMA). In a CDMA system, since the same frequency band may be shared by multiple users, signals of other users become interference signals which may degrade the communication quality of a particular user. When a base station (BS) in a cellular telecommunications system or network communicates with near and remote mobile stations (MS) at the same time, it receives the transmitted signal from the near mobile station at a high level, whereas the signal from the remote mobile station is at a much lower level. Thus, communications between the base station and the remote mobile station present a problem in that the channel quality is sharply degraded by interference from the near mobile station. This may be referred to as the near-far problem. High levels of interference may also result when too much output power is used by the base station on the downlink (DL); where "downlink" defines communications from the base station to mobile station(s).

To obtain high levels of performance in a CDMA or other cellular system, it is important to carefully control the transmit power level of both base stations and mobile stations in the system. Transmit power control limits the amount of self interference produced by the system. Moreover, on the downlink (i.e., from the base station to mobile stations), a precise level of transmit power can serve to balance the forward and reverse link handoff boundaries of a base station or a single sector of a multi-sectored base station. Such balancing may help to reduce the size of the handoff regions, increase overall system capacity, and/or improve remote unit performance in the handoff region.

Failure to control transmit power levels in cellular and other wireless communication systems may adversely affect communication quality. In cellular systems, for example, mobile stations (MS) may transmit a minimum signal level that produces a signal to noise ratio that allows acceptable data recovery at the base station. If a signal transmitted by a MS arrives at the BS receiver at a power level that is too low, the bit error rate may be too high to permit high quality communications due to interference from other mobile stations. On the other hand, if the signal transmitted from the MS to the BS is at a power level that is too high when received at the BS, communication with this particular MS is acceptable, but the high level of power may act as interference to other mobile stations. Thus, closed loop power control systems are typically used so that the base station can control the uplink (UL) powers utilized by respective mobile stations through "up" and "down" instructions sent on the downlink to respective mobile stations. It is also desirable to control relative output power levels (i.e., DL power levels) used by base stations in a cellular telecommunications network in order to minimize interference.

Unfortunately, conventional base stations do not have the ability to efficiently provide precise or absolute control over their transmit power level (i.e., DL power control). Absolute accuracy typically is not achieved. To do so, it is necessary to compensate for variations in the gain in the various components comprising the transmit chain of the BS. Variations in the gain typically occur over temperature and aging such that a simple calibration procedure does not guarantee a precise level of output transmit power over time. Variations in the gain may be compensated by adjusting the overall gain in the transmit chain so that the actual transmit power of the BS matches a calculated desired transmit power. Conventional base stations are not equipped with systems which can perform this function in an efficient manner and thus from a practical standpoint lack the capability to limit self interference and balance their forward and reverse link handoff boundaries.

A potential solution would be to improve the accuracy of all of the individual components within the transmit chain of the BS. Typically, accuracies of individual components of the system are too small to achieve the overall desired transmit power level accuracy. Moreover, in order to improve the accuracy of these components, undesirable expense and burdens would be required, and each component would have to have an accuracy much higher than the needed overall accuracy.

Another possible solution would be to use a calibrated accurate CW test tone to calibrate the system. Unfortunately, a CW test tone implies that during a calibration cycle, the normal operation of the BS is disturbed. This is undesirable for base stations operating in cellular telecommunications systems.

U.S. Pat. No. 5,715,526 (the disclosure of which is hereby incorporated herein by reference), discloses an apparatus and method for controlling transmission power in a cellular communications system. Unfortunately, the system of the '526 patent utilizes formulas to determine the desired output power from data in control bits on a channel-by-channel basis. This channel-by-channel sampling, along with the fact that the '526 transmit power measurements are not frequency selective, is/are undesirable in that added components and/or expense is required. In the '526 patent, at least one sample is needed for each channel, which results in an undesirably large number of samples and components required for taking all these samples. Moreover, because the '526 system is not frequency selective and does not have the capability to track all channels together, it requires use of the illustrated power tracking loop in order to implement compensation for RF loss between the coupler and antenna and implement breathing. The breathing technique disclosed in the '526 patent is thus very complicated, and its application in the analog domain is not always desirable.

In view of the above, it will be apparent to those skilled in the art that there exists a need for an accurate and simplified system and corresponding method for controlling the transmit power level of a base station in a cellular telecommunications system. There also exists a need in the art for a frequency selective RF analog power sensor/detector for use in such a system.

SUMMARY OF THE INVENTION

In the context of a wideband CDMA (WCDMA) type base station (BS), radio frequency (RF) gain is accurately controlled for each of multiple carrier frequencies without having to disturb the normal operation of the amplifier chain once installed in the BS. The power of a summed or combined digital baseband user signal is determined and integrated over a specific time interval. The digital baseband signal is upconverted and amplified by a one or more (e.g., a chain of) RF amplifiers. The power of the transmitted RF signal (DL signal transmitted by the BS) is determined in a manner which is frequency selective, and integrated over the same time interval. The difference between the integrated baseband power and the RF transmit power is then determined in order to provide an overall gain value for the RF chain for the specific carrier frequency measured. This gain value is compared with a target gain value to determine a gain adjustment or correction factor. The gain correction factor is applied in the digital domain prior to digital-to-analog conversion (DAC). Accordingly, gain control is continuously performed during normal operation of the BS. Gain determination and application of the resulting gain adjustment factor is/are determined and performed for each carrier frequency being utilized by the WCDMA base station.

Certain embodiments of this invention are advantageous for a number of reasons. The use of a frequency selective RF power sensor at the BS enables the RF power sensor to be reused in combination with a plurality of different baseband power sensors (one baseband power sensor is provided per carrier frequency to be analyzed). Also, baseband power measurements are performed in the digital domain after the plurality of channels for the specific carrier frequency band at issue have been combined or summed and prior to digital to analog conversion (DAC). A single digital-to-analog converter is typically used for each carrier frequency, so as to handle many channels allocated to that frequency. Thus, the number of samples needed to be taken and the number of digital domain measurements required is significantly less than what is needed in the system of the '526 patent discussed above where the channels are not summed until in the analog domain. Furthermore, certain embodiments of this invention enable gain adjustment and breathing adjustment to be carried out in the digital domain, which are advantageous compared to such adjustments being made in the analog domain.

BRIEF DESCRIPTION OF THE DRAWINGS

The foregoing and other objects, features, and advantages of the invention will be apparent from the following description of preferred example embodiments as well as illustrated in the accompanying drawings in which reference numerals refer to like parts. While individual functional blocks and components are shown in many of the figures, those skilled in the art will appreciate that these functions may be performed by individual hardware circuits, by a suitably programmed digital microprocessor or general purpose computer, by an application specific integrated circuit (ASIC) and/or by one or more digital signaling processes.

DETAILED DESCRIPTION OF THE DRAWINGS

In the following description, for purposes of explanation and not limitation, specific details are set forth, such as particular embodiments, network architectures, signaling flows, protocols, techniques, etc. in order to provide an understanding of the present invention. However, it will be apparent to those skilled in the art that the present invention may be practiced in other embodiments that depart from these specific details. For example, although the present invention is disclosed in the example context of a mobile radio WCDMA communication system, it may also be employed in other types of communications systems such as narrowband CDMA, TDMA, and the like. In certain instances, detailed descriptions of well-known methods, interfaces, devices, protocols, and signaling techniques are omitted so as not to obscure the description of the present invention with unnecessary detail.

Figure 1:
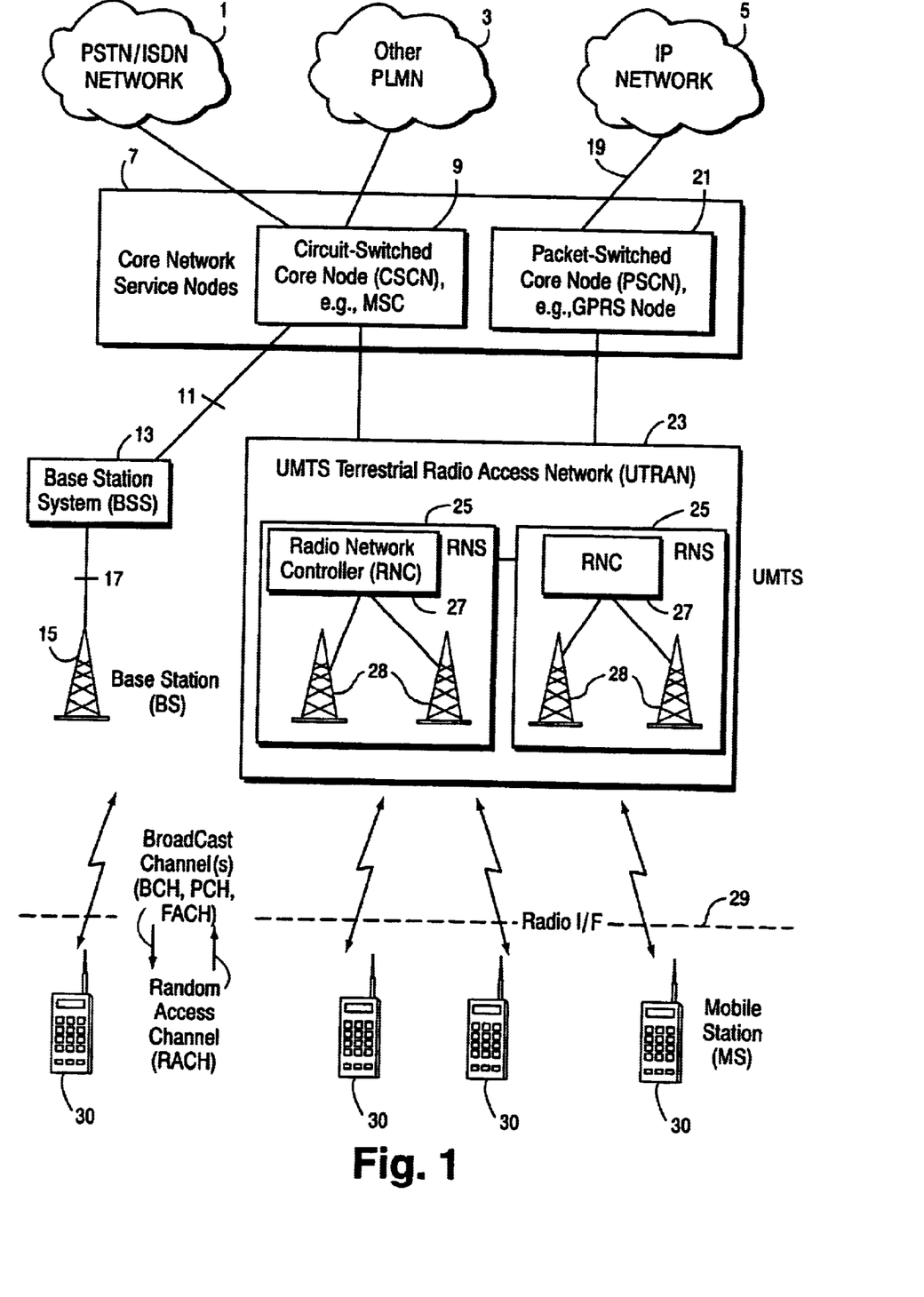
FIG. 1 is a function block diagram illustrating a universal mobile telephone system (UMTS) in which the present invention may be employed.

FIG. 1 illustrates an exemplary context of a universal mobile telecommunications system (UMTS) in which the instant invention may be implemented. A representative, circuit switched, external core network 1 may be, for example, the public switched telephone network (PSTN) and/or the integrated services digital network (ISDN). Another circuit switched, external core, network may correspond to another public land mobile radio network (PLMN) 3. A representative packet switched, external core network 5 may be, for example, an IP network such as the Internet. The core network(s) are coupled with corresponding network service nodes 7. The PSTN/ISDN network 1 and other PLMN networks 3 are connected to a circuit switched core node (CSCN) 9, such as a mobile switching center (MSC), that provides circuit switched services. The UMTS may coexist with an existing cellular network, such as the global system for mobile communication (GSM), where MSC 9 is connected over an interface 11 to a base station(s) subsystem 13 which in turn is connected to radio base station(s) 15 over interface 17.

Packet switched network 5 may be connected over interface 19 to a packet switched core node (PSCN), e.g., a general packet radio service (GPRS) node 21 tailored to provide packet switched type services in the context of GSM which is sometimes referred to as the serving GPRS service node (SGSN). Each of these core network service nodes 9 and 21 also connects to the UMTS terrestrial radio access network (UTRAN) 23 over a radio access network interface. The UTRAN 23 includes one or more radio network systems (RNS) 25 each with a radio network controller (RNC) 27 coupled to a plurality of base stations (BS) 28 and to other RNCs in the UTRAN 23.

Preferably, radio access over interface 29 between base stations 28 and mobile stations (MS) 30 is based upon wideband code division multiple access (WCDMA) with individual radio channels allocated using CDMA channelization or spreading codes. WCDMA, in which multiple carrier frequencies are utilized, provides wide bandwidth and other high transmission rate demands as well as robust features like diversity handoff to ensure high quality communication service in frequently changing environments. Each mobile station (MS) 30 is assigned its own scrambling code in order for a base station to identify transmissions from that particular MS 30. Each MS 30 also uses its own scrambling code to identify transmissions from base stations either on a general broadcast or common channel or transmission specifically intended for that MS 30.

Figure 2:
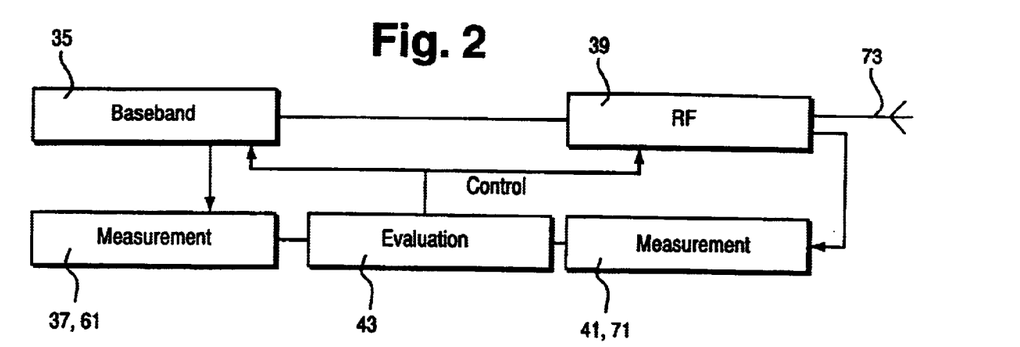
FIG. 2 is a schematic block diagram illustrating an embodiment of this invention which may be utilized within a base station of the system in FIG. 1.

FIG. 2 is a simplified schematic block diagram of an embodiment of this invention which may be provided in a base station (BS) 28 of the FIG. 1 system. The invention makes use of available user signals traveling through the transmit chain of the base station (BS) during normal operation thereof. For a particular carrier frequency utilized in the WCDMA base station 28, after the different channels have been combined or summed and are still in baseband 35 in digital form (i.e., the digital domain), the power (or expected digital power) is computed or measured 37, 61 by integration over a given interval of time. The invention thus employs the baseband user signals themselves 35 during normal operation of the system. The digital baseband user signal(s) is/are then converted from digital to analog (DAC) and upconverted and amplified by a chain of RF amplifiers resulting in an RF signal 39. RF signal 39 is transmitted on the downlink (DL) from the base station to one or more mobile stations (MS) 30. The available power of amplified RF analog signal 39 is measured 41, 71 at a specific frequency at the antenna connector, and integrated over the same time interval.

Still referring to FIG. 2, the resulting digital domain measurement at 37, 61 and resulting analog domain measurement at 41, 71 are evaluated at 43. Comparison at 43 of both measurements gives the overall gain of the RF chain for the specific carrier frequency being measured. This overall or actual gain is compared with a target gain $G_T$ in order to determine a correction or adjustment factor $G_{AF}$. By applying the multiplicative correction or adjustment factor $G_{AF}$ in the digital domain, the overall gain of the system from baseband 35 up to the RF antenna 73 is continually adjusted to the desired target gain. In other embodiments, instead of using a digital adjustment, a choice could be made to use an analog gain adjustment between the TRX 63 and the RF combining 67 of FIG. 4.

The target gain may be determined by the needed gain between the digital domain and the analog domain, thereby getting the desired maximum mean output power belonging to the maximum mean power in the digital domain. The output power may be given by power classes defined by standardization bodies. The belonging power in the digital domain may be chosen by as a design choice by the manufacturer. The same may be true with regard to the target gain, as it may be a design value.

Accordingly, continuous operation of the base station is possible, while gain control is continuously or substantially continuously performed during normal operation of the base station. Thus, users or mobile stations may keep calling or maintain communications with the base station while DL gain control calibration is in process. Still further, the system is advantageous in that the gain correction or adjustment factor $G_{AF}$ is applied to the baseband signal in the digital domain. Accuracy in the digital domain can be higher than in the analog domain. Still further, the RF power sensor at 41, 71 is frequency selective and can thus be reused in combination with each of a plurality of baseband power sensors 37, 61 provided in the system (i.e., only one RF sensor at 41 need be provided, as opposed to the plurality of baseband sensors 37, 61 which are needed—one baseband sensor 37, 61 is needed for each carrier frequency to be measured). Additionally, because the gain control system is carrier selective, it can calibrate each carrier frequency on its own even though a plurality of carrier frequencies may be present at the same time (e.g., in WCDMA environments in which multiple carrier power amplifiers are typically utilized). Additionally, another advantage is that the number of RF power sensors needed is reduced; RF power sensors are more costly than BB power sensors which may be implemented as a part in an ASIC, DSP or FPGA.

Figure 4:
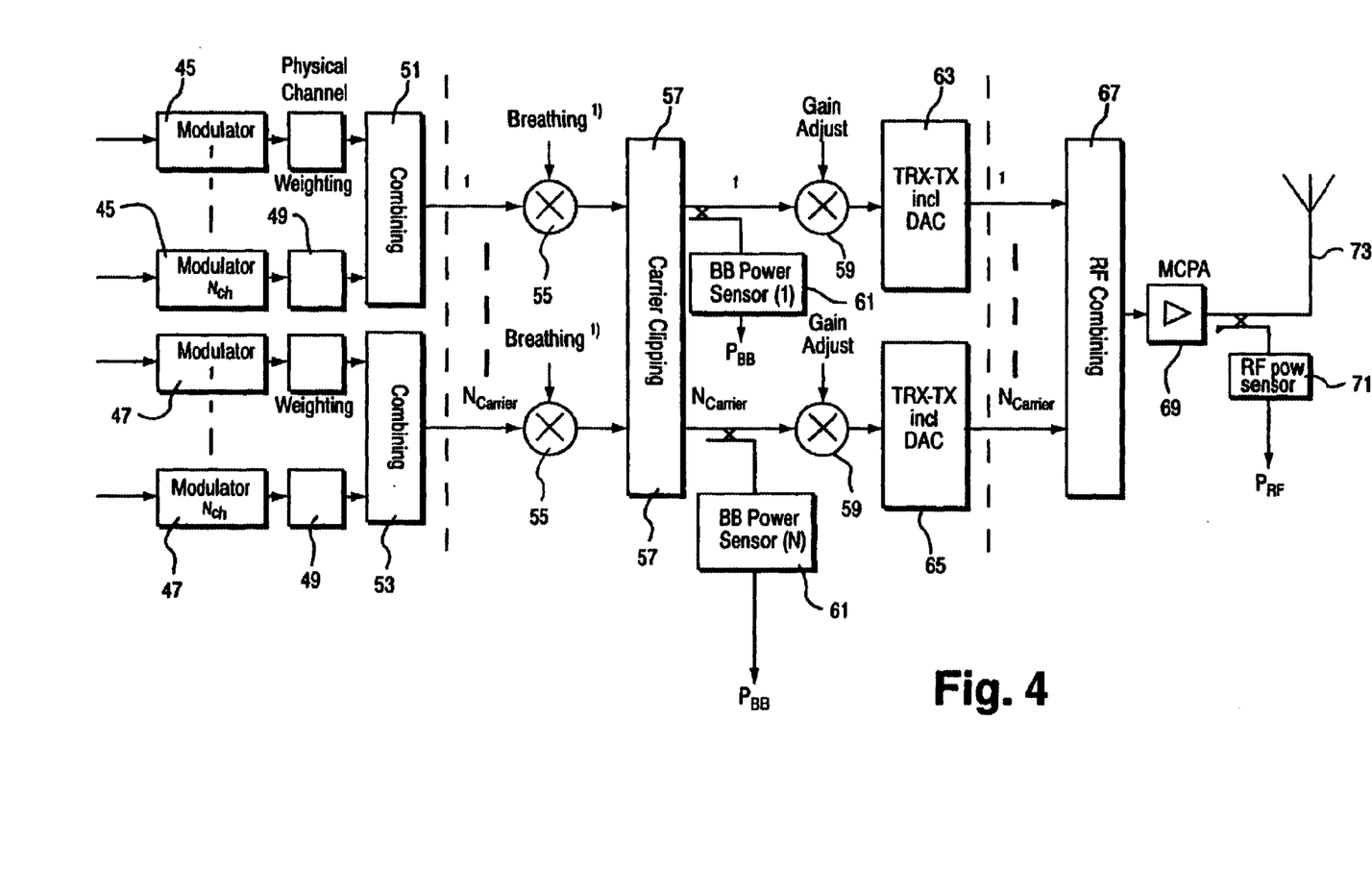
FIG. 4 is a block diagram of the transmit chain in a base station of FIG. 1, according to an embodiment of this invention in which power control and breathing are implemented in the digital domain.

FIG. 4 is a more detailed block diagram of the signal chain provided in a base station in which the embodiment in FIG. 2 is utilized. Referring to FIG. 4, the chain includes a plurality of modulators 45 for a first carrier frequency band, a plurality of modulators 47 for a second carrier frequency band $N_{CARRIER}$, weighting 49 at the output of each modulator, combining function or summer 51 for combining or summing the different physical channels in the digital domain at the first carrier frequency, combining function or summer 53 for combining or summing the different physical channels in the digital domain at the second carrier frequency, multipliers 55 which for implementing breathing on the summed signals in the digital domain on the carrier level, carrier clipping circuit 57 for reducing the peak average ratio of the combined signals in the digital domain prior to the inputs of the multi-carrier power amplifier (MCPA) 69, multipliers 59 for enabling respective gain correction or adjustment factors $G_{AF}$ to be implemented in the digital domain prior to DAC for the respective carrier frequencies, baseband power sensors 61 (one baseband power sensor is provided for each carrier frequency in certain embodiments), a single digital-to-analog digital converter (DAC) 63 for converting the combined digital channels of the first carrier frequency to analog, a single digital-to-analog converter (DAC) 65 for converting the combined digital channels of the second carrier frequency to analog, and so forth, RF combining circuit 67 for combining the different carrier frequencies into a composite signal, multi-carrier power amplifier (MCPA) 69 for amplifying the composite signal, a single RF power sensor 71 for measuring the available RF power at a specific frequency at the antenna connector, and RF antenna 73 for enabling the composite signal to be sent on the downlink (DL) to one or more mobile stations 30 in the cell defined by the base station 28. As shown in FIG. 4, the baseband (BB) power is measured in the digital domain at 61 between clipping 57 and the location where gain adjustment is performed 59 in preferred embodiments of this invention.

Because RF power sensor 71 is frequency selective, it can be used in combination with each of the plurality of different baseband power sensors 61, as a different baseband power sensor 61 may be used for each carrier frequency. Moreover, because of the frequency selective nature of RF power sensor 71, a different gain adjustment or correction factor $G_{AF}$ is typically calculated or determined for each of the plurality of carrier frequencies. Thus, a different gain adjustment may be provided on each carrier frequency, in order to meet the target gain requirements of the system. In preferred embodiments, the system of FIG. 4 utilizes WCDMA techniques in order to format and develop the DL signal, although other multiple access techniques may be utilized in alternative embodiments of this invention.

Figure 5:
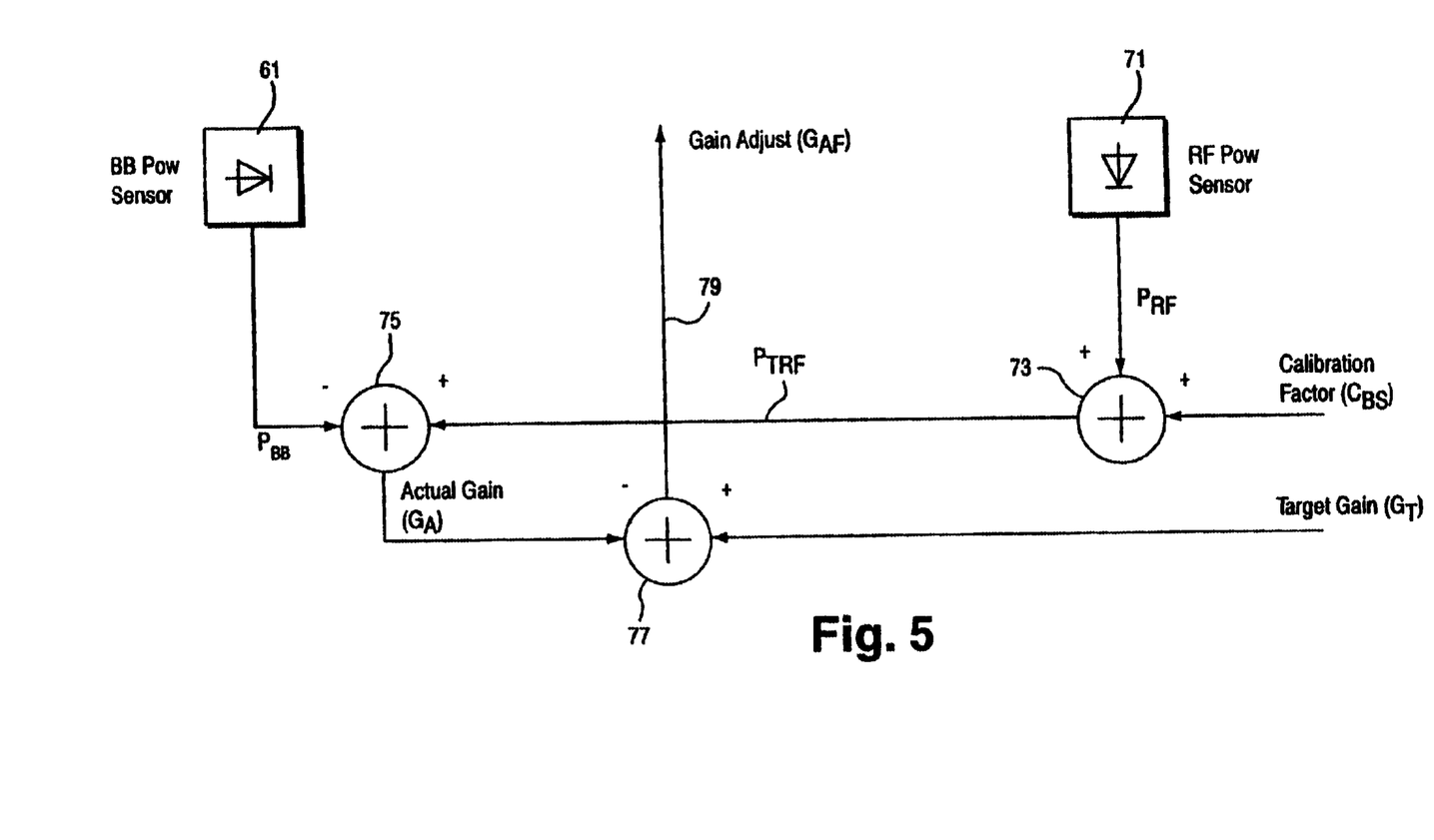
FIG. 5 is a schematic block diagram of a gain adjustment system which may be utilized in the context of the embodiment illustrated in FIGS. 1–4, with specific reference to FIG. 4.
Figure 6:
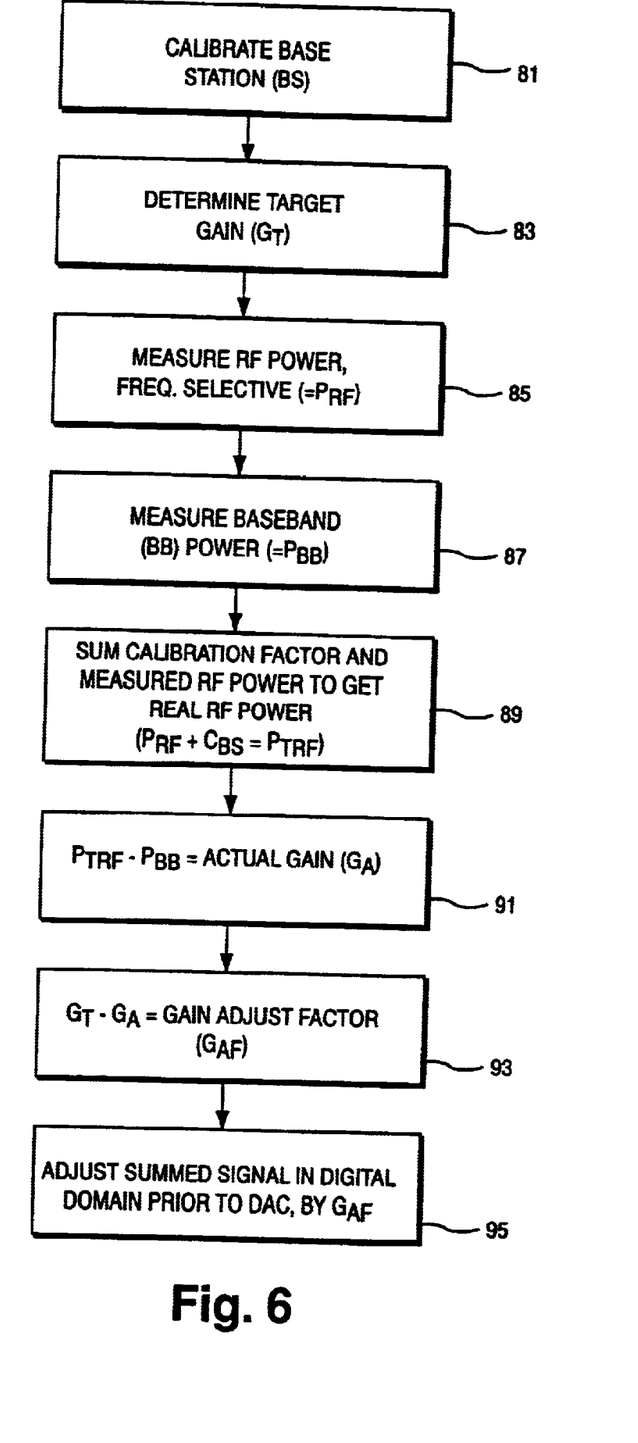
FIG. 6 is a flowchart illustrating certain steps taken according to an embodiment of this invention.

FIG. 5 illustrates how the gain adjustment or correction factor $G_{AF}$ is determined for an exemplary frequency in accordance with the system of FIGS. 1–4 (especially with reference to FIGS. 2 and 4). FIG. 6 is a flowchart exemplifying steps which may be taken in accordance with an embodiment of this invention. Referring to these figures, initially the base station (BS) 28 is calibrated in order to determine calibration factor $C_{BS}$ (see step 81 in FIG. 6). The calibration factor $C_{BS}$ is determined for each base station, preferably at the time of the RF DL chain installation. Thus, the calibration factor typically is a constant for each base station (although, one base station may have one calibration factor and another base station may have a different calibration factor). The calibration factor $C_{BS}$ is used to compensate for errors such as antenna feeder cable length at each base station site combined with VSWR on that cable. In certain embodiments, the calibration factor may be supplied by the manufacturer of the RF power sensor.

Referring especially to FIGS. 5–6, a target gain $G_T$ is determined (see step 83 in FIG. 6). RF power sensor 71 calculates or measures the available DL RF power $P_{RF}$ at a specific frequency at the antenna connector (see step 85 in FIG. 6). $P_{RF}$ is integrated over a given time interval. For the frequency at issue, a corresponding baseband power sensor 61 measures the baseband power $P_{BB}$ in the digital domain for that carrier frequency (see step 87 in FIG. 6). As shown in FIG. 5, the calibration factor $C_{BS}$ and the measured RF power $P_{RF}$ are combined at summer 73 to get real RF power value $P_{TRF}$ (see also step 89 in FIG. 6). The difference between the real RF power value $P_{TRF}$ and the measured baseband power $P_{BB}$ for the frequency at issue is then determined at subtractor (i.e., comparator determining a difference) 75. Subtractor 75 outputs the actual gain $G_A$ (see step 91 in FIG. 6). The difference between the actual gain $G_A$ and the target gain $G_T$ at subtractor or comparator 77 in order to get a gain adjustment value $G_{AF}$ (see step 93 in FIG. 6).

The gain adjustment factor or value $G_{AF}$ is output from subtractor/comparator 77 at 79, as illustrated in FIG. 5. The gain adjustment or correction factor $G_{AF}$ for the particular frequency measured by sensor(s) 61, 71 is then applied to the corresponding baseband of that same carrier frequency in the digital domain, via a multiplier 59 as shown in FIG. 4 (see step 95 in FIG. 6). This process may be repeated for each carrier frequency utilized by the WCDMA base station, in circular fashion so that each carrier frequency is adjusted in due course during normal operation of the base station 28. Thus, in certain embodiments, a different gain adjustment value $G_{AF}$ may be applied to each different carrier frequency at the base station.

Baseband power sensors 61 measure the expected power when the user signals in the baseband are still in digital form and after they have been combined or summed at 51, 53 with the other channels on the particular carrier frequency at issue. At this point, temperature and aging are of no influence. Thus, according to certain embodiments of this invention, the baseband power sensors 61 are not interested in all the individual channels, but only in the combination. Thus, a separate baseband power sensor is not required for each channel. Only one is required for each carrier frequency. A baseband power sensor 61 as shown in any of FIGS. 3–5 may measure baseband power by taking into consideration both the I phase stream and the Q phase stream in the basebands. In the baseband power determining process, the I and Q phase streams may be separated. An I sample may be taken and squared, and thereafter combined with a Q sample which has been taken and squared. After adding up the squared I and Q samples, the process is repeated for another I/Q sample, and then another, and then another, and so on. The resulting samples may be added up and divided by the number of total samples taken (e.g., 10) for normalization. The normalized value may then be converted from linear to the logarithmic domain, and forwarded to subtractor/comparator 75 as signal $P_{BB}$.

Figure 3:
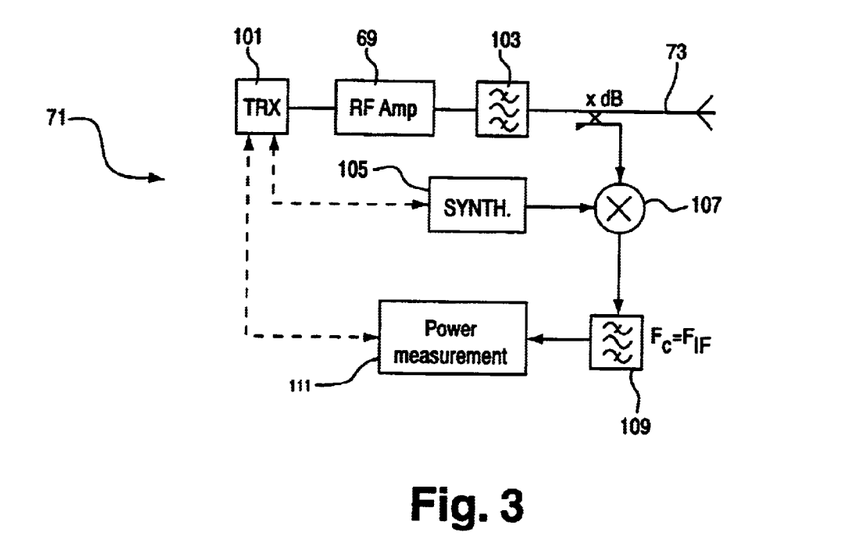
FIG. 3 is a frequency selective RF power measurement circuit which may be utilized to measure the RF transmit power of the BS in the FIG. 2 embodiment.

Turning to frequency selective RF power sensor 71, exemplary circuitry for implementing this is illustrated in FIG. 3. Referring to FIG. 3, the RF power sensor 71 utilizes transmitter 101, RF amplifier(s) 69 which is part of the normal operating chain of the base station, coupler 103 for detecting the RF analog signal output, synthesizer 105 for generating a frequency slightly offset from the frequency to be measured, mixer 107, filter 109, and power measurement circuit 111. The synthesizer, mixer and filter in FIG. 3 are utilized to select the carrier frequency for which the power will be measured at 111. The dotted lines indicate the needed synchronization of the starting point of the integration interval of the RF power sensor and the setting of the frequency of the synthesizer 105 at which the RF power sensor is to measure. The starting point of the integration interval of the BB power sensor, which is in the TRX 101 in FIG. 3, is preferably synchronized with the starting point of the integration integral of the RF power sensor. The synchronization error is typically in the order of microseconds depending on the length of the integration interval.

As discussed above, because the different channels are combined at 51 in the digital domain prior to digital to analog conversion (DAC), and gain adjustment is also provided in the digital domain prior to digital to DAC, breathing may also be performed via multipliers 55 in the digital domain in a manner more efficient than that of the '526 patent listed above. The breathing adjustment factor may be based upon and/or a function of the total UL interference measured in the cell of the BS. Thus, the BS may include a UL interference detecting circuit (not shown) for determining the total uplink interference at the base station from all mobile stations in the cell. The output of the UL interference detecting circuit may be provided to a breathing algorithm for determining the degree to which the downlink signal should be adjusted in view of the same. The breathing factor output from the algorithm is forwarded to respective multiplier(s) 55 for application to the appropriate baseband signal(s) in the digital domain. Breathing, in essence, allows shrinking and growing of cell sizes in order to compensate for higher or lower levels of uplink interference.

In preferred embodiments discussed above, this invention is utilized in the context of a base station (BS) of a cellular telecommunications network. In other embodiments of this invention, this invention may be utilized in the context of a MS 30 in a cellular telecommunications network. In still further embodiments of this invention, this invention may be utilized in the context of any other type of transmitter which transmits signals in a wireless manner to a receiver(s).

While the present invention has been described in terms of a particular embodiment, those skilled in the art will recognize that the present invention is not limited to the specific example embodiments described and illustrated herein. Different formats, embodiments, and adaptations besides those shown and described as well as many modifications, variations, and equivalent arrangements may also be used to implement the invention. Accordingly, it is intended that the invention be limited only by the scope of the claims appended hereto.

What is claimed is:

1. A method of controlling output power of a base station in a wideband code division multiple access (WCDMA) cellular telecommunications system, the method comprising the steps of:

combining a plurality of modulated channels into a combined digital baseband signal for a first of a plurality of carrier frequencies transmitted by the base station in the WCDMA cellular telecommunications system;

determining, in a digital domain, a power of the combined digital baseband signal for the first carrier frequency;

converting the digital baseband signal to an analog signal;

determining an RF power of the analog signal for the first carrier frequency, while excluding at least a second of the carrier frequencies transmitted by the base station;

calculating a gain value proximate an actual gain utilizing at least the determined power of the combined digital baseband signal and the determined RF power of the analog signal;

determining a gain adjustment factor or value utilizing at least the calculated gain value and a target gain value; and applying the gain adjustment factor or value to a digital baseband signal for the first carrier frequency in order to adjust the gain of the base station toward the target gain value.

2. The method of claim 1, further comprising the steps of:

determining, in the digital domain, a power of a combined digital baseband signal for the second carrier frequency;

determining an RF power of the analog signal for the second carrier frequency;

determining a gain adjustment factor or value for the second carrier frequency, wherein the gain adjustment factor or value for the second carrier frequency is different than the gain adjustment factor or value for the first carrier frequency; and applying the gain adjustment factor or value for the second carrier frequency to a digital baseband signal for the second carrier frequency in order to adjust the gain of the base station toward the target gain value.

3. The method of claim 1, wherein said step of calculating a gain value proximate an actual gain comprises combining the determined RF power of the analog signal with a calibration factor relating to the base station so as to obtain a first power value.

4. The method of claim 3, further comprising determining a difference between the first power value and the power of the combined digital baseband signal to obtain the calculated gain value proximate an actual gain.

5. The method of claim 4, further comprising determining a difference between the calculated gain value and the target gain value to obtain the gain adjustment factor or value.

6. The method of claim 5, further comprising applying the gain adjustment factor or value to the digital baseband signal for the first carrier frequency at a location in the digital domain following a combining of the plurality of modulated channels and before a location in the digital domain where power of the combined digital baseband signal for the first carrier frequency is determined.

7. The method of claim 1, further comprising the step of applying a breathing factor to the digital baseband signal for the first carrier frequency at a location in the digital domain following a combining of the plurality of modulated channels.

8. The method of claim 1, wherein the gain adjustment factor or value is applied to the digital baseband signal prior to a summer which sums the signal for the first carrier frequency with one or more other carrier frequencies.

9. A method of controlling output power of a transmitter, the method comprising the steps of:

combining a plurality of modulated channels into a combined digital baseband signal for a first carrier frequency;

determining, in a digital domain, a power of the combined digital baseband signal;

converting the digital baseband signal to an analog signal;

determining power of the analog signal for the first carrier frequency;

calculating a gain value utilizing at least the determined power of the combined digital baseband signal and the determined power of the analog signal;

determining a gain adjustment factor or value utilizing at least the calculated gain value and a target gain; and applying the gain adjustment factor or value to a digital baseband signal for the first carrier frequency in the transmitter in order to adjust the gain of the transmitter toward the target gain.

10. The method of claim 9, wherein said step of determining power of the analog signal for the first carrier frequency further comprises excluding at least a second carrier frequency to be transmitted by the transmitter; and the method further comprising the step of the transmitter transmitting each of the first and second carrier frequencies in a wireless manner.

11. The method of claim 10, further comprising the steps of:

determining, in the digital domain, a power of a combined digital baseband signal for the second carrier frequency;

determining power of the analog signal for the second carrier frequency while excluding the first carrier frequency;

determining a gain adjustment factor or value for the second carrier frequency, wherein the gain adjustment factor or value for the second carrier frequency is different than the gain adjustment factor or value for the first carrier frequency; and applying the gain adjustment factor or value for the second carrier frequency to a digital baseband signal for the second carrier frequency in the digital domain in order to adjust the gain of the transmitter toward the target gain.

12. The method of claim 9, wherein the transmitter is a base station in a cellular telecommunications network.

13. The method of claim 12, wherein the base station is a CDMA base station.

14. The method of claim 9, wherein said step of calculating a gain value comprises combining the determined power of the analog signal with a calibration factor relating to the transmitter so as to obtain a first power value.

15. The method of claim 14, further comprising determining a difference between the first power value and the power of the combined digital baseband signal to obtain the gain value.

16. The method of claim 15, further comprising determining a difference between the gain value and the target gain to obtain the gain adjustment factor or value.

17. The method of claim 15, further comprising applying the gain adjustment factor or value to the digital baseband signal for the first carrier frequency at a location in the digital domain following a combining of the plurality of modulated channels and before a location in the digital domain where power of the combined digital baseband signal for the first carrier frequency is determined.

18. The method of claim 9, wherein the gain adjustment factor or value is applied to the digital baseband signal prior to a summer which sums the signal for the first carrier frequency with one or more other carrier frequencies.

19. A base station in a wideband code division multiple access (WCDMA) cellular telecommunications network, the base station comprising:

a combiner for combining a plurality of modulated channels into a combined digital baseband signal for a first of a plurality of carrier frequencies to be transmitted by the base station to at least one mobile station located in a cell of the base station;

a first baseband power sensor for determining, in a digital domain, a power of the combined digital baseband signal for the first carrier frequency;

a digital to analog converter for converting the digital baseband signal to an analog signal;

an RF power sensor for determining power of the analog signal for the first carrier frequency;

gain calculating circuitry for calculating a gain adjustment factor or value based at least upon a target gain, the determined power of the analog signal, and the determined power of the digital baseband signal; and gain adjustment circuitry for applying the gain adjustment factor or value to a digital baseband signal for the first carrier frequency in order to adjust the gain of the base station toward the target gain.

20. The base station of claim 19, wherein said RF power sensor is frequency selective and when determining power of the analog signal for the first carrier frequency does not determine power of a second carrier frequency also transmitted by the base station; and wherein the base station further comprises a second baseband power sensor for determining, in the digital domain, a power of a combined digital baseband signal for the second carrier frequency.

21. The base station of claim 19, wherein said gain calculating circuitry comprises a summer for combining the determined power of the analog signal with a calibration factor relating to the base station so as to obtain a first power value.

22. The base station of claim 21, wherein said gain calculating circuitry further comprises a first comparator for determining a difference between the first power value and the power of the combined digital baseband signal to obtain the gain value.

23. The base station of claim 22, wherein said gain calculating circuitry further comprises a second comparator for determining a difference between the gain value and the target gain to obtain the gain adjustment factor or value.

24. The base station of claim 23, wherein said gain adjustment circuitry comprises a multiplying function.

25. The base station of claim 19, wherein the gain adjustment factor or value is applied to the digital baseband signal prior to a summer which sums the signal for the first carrier frequency with one or more other carrier frequencies.

* * * * *